Dec. 22, 1942.  G. HANSEN ET AL  2,305,777

MEASURING PRISM FOR REFRACTOMETERS

Filed Nov. 25, 1940

Inventors:
Gerhard Hansen.
Hans Gehrig

Patented Dec. 22, 1942

2,305,777

UNITED STATES PATENT OFFICE 2,305,777

MEASURING PRISM FOR REFRACTOMETERS

Gerhard Hansen and Hans Gehne, Jena, Germany; vested in the Alien Property Custodian Application November 25, 1940, Serial No. 367,140
In Germany December 15, 1939

3 Claims. (Cl. 88—14)

In measuring prisms for refractometers the measuring surface, i. e., the surface with which the substance under investigation comes into contact, is subject to all kinds of most objectionable injuries, be it by chemical attack on the part of such substances, or by mechanical damages caused through impurities in said substances.

In the event of no material being available for the prism satisfying the conditions required in respect of refractive capacity and of color dispersion as well as the conditions in respect of adequate chemical and mechanical resistance, this drawback can be met with in accordance with the invention by bringing the measuring surface of the prism into close contact (preferably by cementing) with a planoparallel plate consisting of transparent material which on the one hand has a greater chemical and mechanical resistivity and on the other a greater refractive index than the material the prism is made of. If the prism is cemented to the plate the refractive index of the plate material must surpass the refractive index of the cementing material.

Materials coming into question for the plate to be placed onto the measuring prism are such as, for instance, crystals of corundum, spinel or quartz.

It is expedient to have the protection plate protrude beyond the measuring prism thus ensuring that the substance to be tested can be prevented from coming into contact not only with the measuring prism, but also with the metallic parts.

Figure 1:
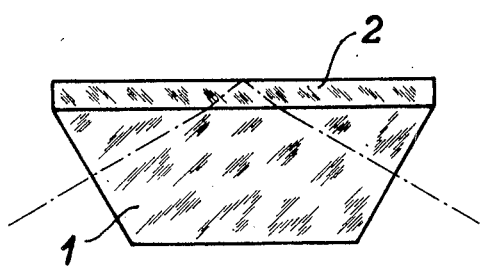
Figure 2:
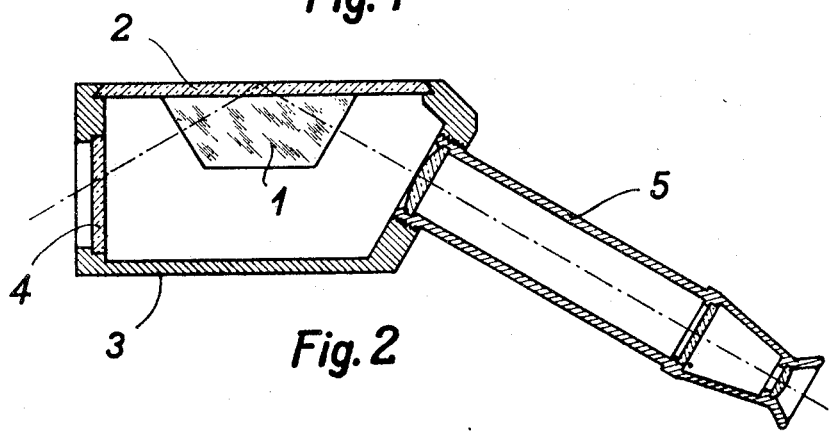

Fig. 1 of the annexed drawing illustrates a refractometer-prism according to the invention, while Fig. 2 shows a section through the optic axis of a refractometer equipped with such a prism.

The prism 1 is made of glass and is cemented to a plano-parallel plate 2 of corundum-crystal. The cement, same as said crystal has a greater refractive index than the glass used for prism 1.

The refractometer shown in the drawing contains a metal housing 3 on which are provided the measuring prism 1 with the corundum crystal 2 cemented thereon, a window 4 serving for the entry of light, and the measuring telescope 5. The size of the corundum crystal 2 is such that the substance to be applied onto its outer surface for testing purposes need not come into contact with the housing 3 and the telescope 5.

We claim:

1. A prism system for refractometers, comprising a transparent planoparallel plate and a prism, means for connecting said plate and said prism, said means ensuring a close contact of the entire useful area of one surface of said prism with one of the two parallel surfaces of said plate and excluding the test material from said useful area, the capacity of chemical and mechanical resistance of the plate material surpassing the corresponding capacity of resistance of the prism material, and the refractive index of the plate material surpassing the refractive index of the prism material.

2. A prism system for refractometers, comprising a transparent planoparallel plate and a prism which is cemented to said plate for ensuring a close contact of the entire useful area of one surface of said prism with one of the two parallel surfaces of said plate and excluding the test material from said useful area, the capacity of chemical and mechanical resistance of the plate material surpassing the corresponding capacity of resistance of the prism material, and the refractive index of the plate material surpassing the refractive index of the prism material and of the material for cementing said prism to said plate.

3. In a refractometer a housing, a transparent plano-parallel plate forming a wall of said housing, a prism lying inside said housing and being cemented to said plate for ensuring a close contact of the entire useful area of one surface of said prism with the inner of the surfaces of said plate, the area of each of said two parallel surfaces surpassing the area of said prism surface, said housing being provided with two apertures at the ends thereof, said two apertures being closed by a window and a telescope, respectively, said window allowing the light for illuminating the test material to enter the housing and after running through said prism and said plate to strike the outer surface of said plate, said telescope receiving said light after being reflected from said outer surface, the capacity of chemical and mechanical resistance of the plate material surpassing the corresponding capacity of resistance of the prism material, and the refractive index of the plate material surpassing the refractive index of the prism material and of the material for cementing said prism to said plate.

GERHARD HANSEN.
HANS GEHNE.